(12) United States Patent
Yamada et al.

(10) Patent No.: US 12,496,925 B2
(45) Date of Patent: Dec. 16, 2025

(54) METHOD OF PROVIDING POWER CHARGING SERVICES TO A VEHICLE

(71) Applicant: TOYOTA JIDOSHA KABUSHIKI KAISHA, Toyota (JP)

(72) Inventors: Kenichi Yamada, Nisshin (JP); Toshiki Kashiwakura, Tokyo (JP); Akane Umezu, Nagoya (JP); Kayo Tsumoto, Nisshin (JP); Yuta Shishime, Tokyo (JP); Satoshi Komamine, Nagoya (JP); Kenji Ishiyama, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 18/502,491

(22) Filed: Nov. 6, 2023

(65) Prior Publication Data
US 2024/0239222 A1    Jul. 18, 2024

(30) Foreign Application Priority Data

Jan. 18, 2023   (JP) .................................. 2023-006072

(51) Int. Cl.
*B60L 53/37*   (2019.01)
*B60L 53/57*   (2019.01)

(52) U.S. Cl.
CPC ............... *B60L 53/37* (2019.02); *B60L 53/57* (2019.02)

(58) Field of Classification Search
CPC .................................. B60L 53/37; B60L 53/57
See application file for complete search history.

(56) References Cited

U.S. PATENT DOCUMENTS

| | | | |
|---|---|---|---|
| 6,614,204 B2* | 9/2003 | Pellegrino | B60L 53/62 320/109 |
| 8,965,669 B2* | 2/2015 | Fisher | G06Q 10/047 701/123 |
| 9,944,192 B2* | 4/2018 | Ricci | B60L 53/38 |
| 11,391,597 B2* | 7/2022 | Teske | G01C 21/3697 |
| 2014/0021908 A1* | 1/2014 | McCool | H02J 7/02 320/108 |
| 2021/0249882 A1* | 8/2021 | Baldasare | H04M 1/72409 |

FOREIGN PATENT DOCUMENTS

| | | |
|---|---|---|
| JP | 2019-113998 A | 7/2019 |
| JP | 2021-121885 A | 8/2021 |
| JP | 2022-007162 A | 1/2022 |

* cited by examiner

*Primary Examiner* — Gertrude Arthur Jeanglaude
(74) *Attorney, Agent, or Firm* — SoraIP, Inc.

(57) ABSTRACT

The method is a method executed by a control device used to provide a charging service for transporting a power supply facility used for charging a vehicle to a user-specified location, the method comprising: acquiring specified location information about the specified location; and determining whether to transport the power supply equipment based on the area of the designated location.

3 Claims, 3 Drawing Sheets

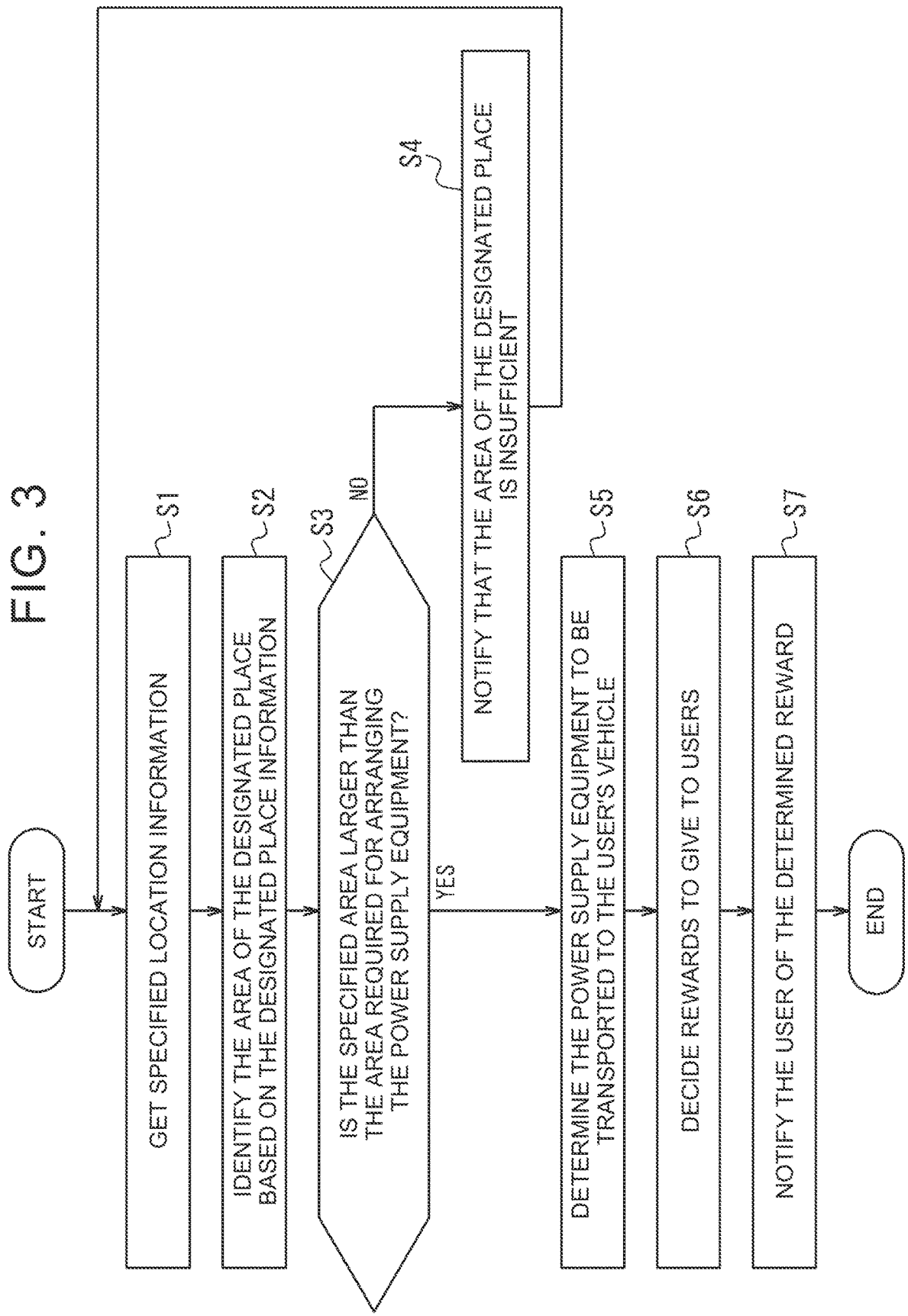

METHOD OF PROVIDING POWER CHARGING SERVICES TO A VEHICLE

CROSS-REFERENCE TO RELATED APPLICATION

This application claims priority to Japanese Patent Application No. 2023-006072 filed on Jan. 18, 2023, incorporated herein by reference in its entirety.

BACKGROUND

1. Technical Field

The present disclosure relates to a method.

2. Description of Related Art

Conventionally, there has been known a technique of providing a charging service for a vehicle when the charge amount of the battery of the vehicle becomes equal to or less than a predetermined value. For example, Japanese Unexamined Patent Application Publication No. 2021-121885 (JP 2021-121885 A) discloses that a charging vehicle travels to the location of the vehicle, and the driver of the charging vehicle charges the battery of the vehicle.

SUMMARY

In the conventional charging reservation system, there was a case where it was not possible to secure a space for parking the charging vehicle that went to the user's vehicle. Thus, there is room for improvement in a technique for providing charging services.

An object of the present disclosure made in view of such circumstances is to improve a technique for providing charging services.

A method according to an embodiment of the present disclosure is a method that is executed by a control device used for providing a charging service in which power supply equipment used for charging a vehicle is transported to a designated location designated by a user.

The method includes obtaining designated location information about the designated location, identifying an area of the designated location based on the designated location information, and determining whether to transport the power supply equipment based on the area of the designated location.

According to the embodiment of the present disclosure, it is possible to improve a technique for providing charging services.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing the operation of the control device according to this embodiment.

DETAILED DESCRIPTION OF EMBODIMENTS

Hereinafter, an embodiment of the present disclosure will be described with reference to the drawings. In each drawing, the same or corresponding portions are denoted by the same reference signs. In the description of the present embodiment, description of the same or corresponding components will be appropriately omitted or simplified.

Figure 1:
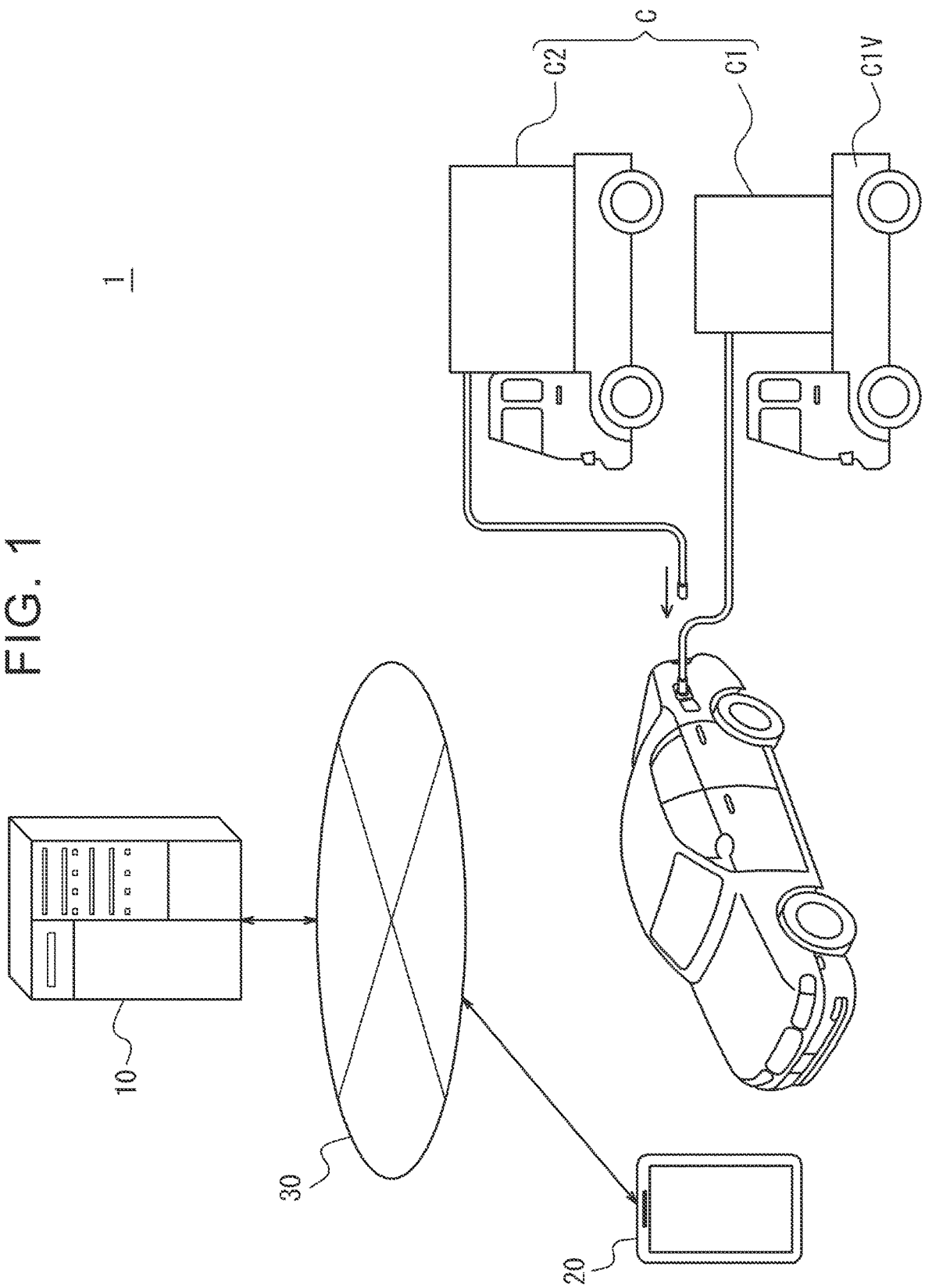
FIG. 1 is a diagram showing a schematic configuration of a system according to an embodiment of the present disclosure.

First, an outline of a system 1 according to an embodiment of the present disclosure will be described with reference to FIG. 1. A system 1 includes a control device 10 and a terminal device 20. Each device is communicatively connected to each other via a network 30 including, for example, the Internet.

The system 1 according to this embodiment is used to provide a so-called rush charging service. The rush charging service is a service that receives a request from a user who wishes to charge the vehicle V, delivers the power supply equipment C used for charging the vehicle V to a location designated by the user, and collects the equipment after the charging operation is completed. The designated place of the user is a space reserved in advance by the user for arranging the power supply equipment C. For example, a vacant space in the site of the user's house, or an empty space next to a place where the vehicle V is parked in an arbitrary parking lot, etc.

The control device 10 is installed in a facility such as a data center. The control device 10 is, for example, a server belonging to a cloud computing system or other computing system.

The terminal device 20 is held by a user. The terminal device 20 is, for example, a mobile device such as a mobile phone, a smart phone, or a tablet, or a PC. PC is an abbreviation for personal computer.

Network 30 includes the Internet, at least one WAN, at least one MAN, or combinations thereof. WAN is an abbreviation for wide area network. MAN is an abbreviation for metropolitan area network. Network 30 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation for "local area network".

Vehicle V is any kind of vehicle that uses electric power for at least part of its drive, such as a Battery Electric Vehicle (BEV), Hybrid Electric Vehicle (HEV), Plug-in Hybrid Electric Vehicle (PHEV), or Fuel Cell Electric Vehicle (FCEV). A vehicle V is a vehicle in which a user rides.

The power supply equipment C includes, for example, a power supply device C1 equipped with a storage battery that can be installed on the ground and charged to the vehicle V, or a vehicle equipped with a storage battery. Hereinafter, the vehicle as the power supply equipment C is also referred to as a power supply vehicle C2. The power supply equipment C is managed by a business that provides charging services.

The power supply device C1 is loaded on a transportation vehicle C1V of the business operator and delivered to the vehicle V, for example. The power supply device C1 is placed at a designated location to provide a charging service. The power supply vehicle C2 moves to the vehicle V, parks at a designated location, and provides a charging service. Specifically, after arriving at the user's vehicle V, the driver of the transportation vehicle C1V or the power supply vehicle C2 connects the vehicle V and the power supply device C1 or power supply vehicle C2 with a cable. Then, the battery of the vehicle V is charged. When the power supply vehicle C2 moves by automatic operation, the user may perform the charging work by himself/herself.

After the charging service is provided, the power supply device C1 is collected, loaded again on the transportation vehicle C1V, and returned to the operator. The power supply vehicle C2 also returns to the operator after the charging service is provided. Not limited to this, the power supply device C1 or the power supply vehicle C2 may go to another user's vehicle V to provide the charging service, and then return to the business operator. The power supply vehicle C2 may be movable by automatic operation. Automated driving includes, but is not limited to, levels 1 to 5 defined by the Society of Automotive Engineers (SAE), but may be defined arbitrarily. The power supply vehicle C2 is not limited to this, and may be any vehicle driven by a driver.

First, the outline of the present embodiment will be described, and the details will be described later. The control device 10 is used to provide a charging service for transporting the power supply equipment C used for charging the vehicle V to a location designated by the user. The control device 10 acquires the specified location information about the specified location, specifies the area of the specified location based on the specified location information, and determines whether to transport the power supply equipment C based on the area of the specified location.

According to the present embodiment, the control device 10 can automatically determine whether or not the area of the designated place where the power supply equipment C is arranged is sufficient. Therefore, it is possible to avoid a situation in which there is no space for arranging the power supply equipment C after the power supply equipment C is transported to the designated location, and the charging service is delayed. Therefore, it is possible to improve the technology of providing charging services.

Figure 2:
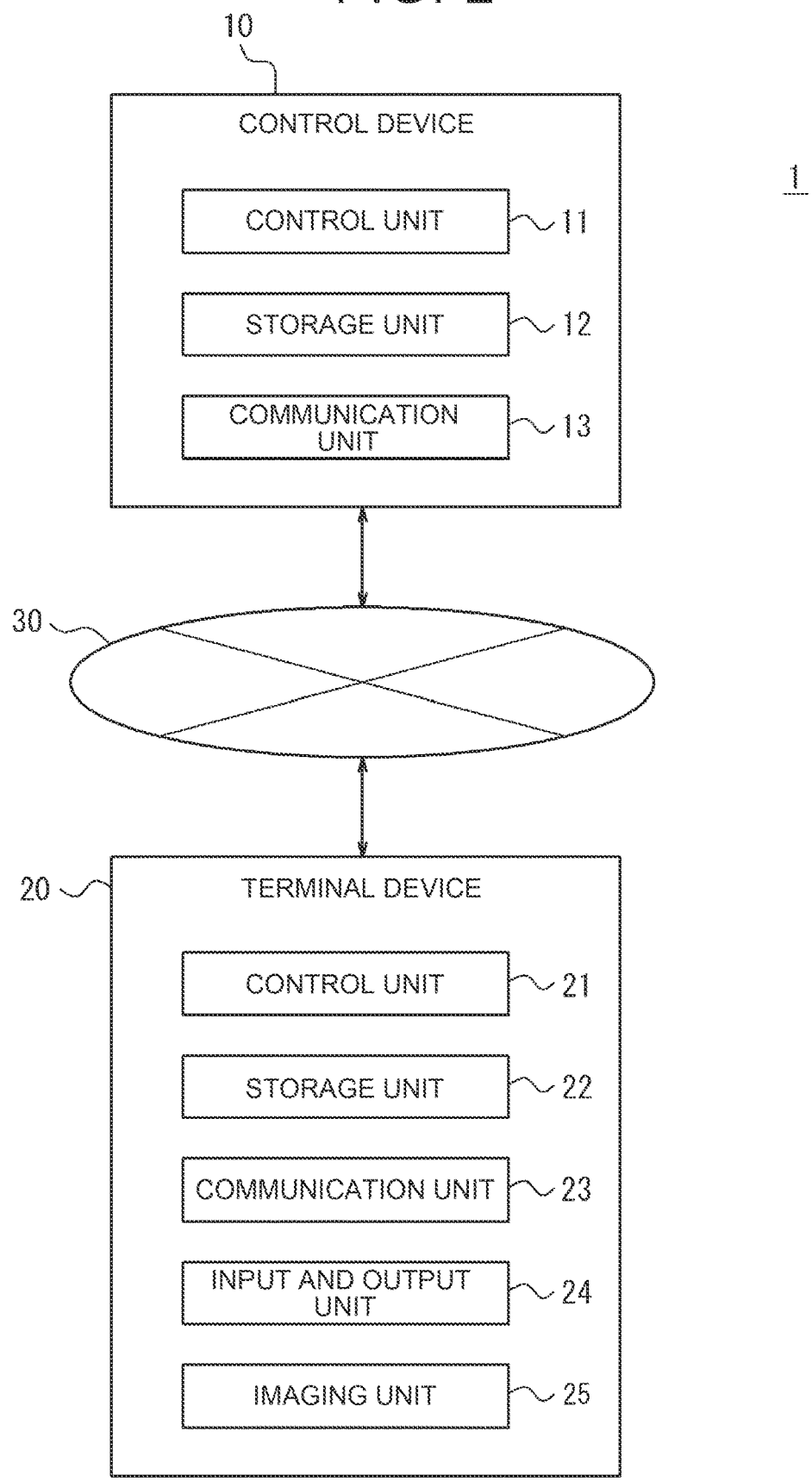
FIG. 2 is a block diagram showing a schematic configuration of a system according to an embodiment of the present disclosure.

Next, each configuration of the system 1 will be described in detail with reference to FIG. 2.

Control Device 10

The control device 10 includes a control unit 11, a storage unit 12 and a communication unit 13.

Control unit 11 includes at least one processor, at least one dedicated circuit, or a combination thereof. A processor may be a general-purpose processor such as a CPU or GPU, or a dedicated processor specialized for specific processing. "CPU" is an abbreviation for central processing unit. "GPU" is an abbreviation for graphics processing unit. A dedicated circuit is, for example, an FPGA or an ASIC. "FPGA" is an abbreviation for field-programmable gate array. "ASIC" is an abbreviation for application specific integrated circuit. The control unit 11 executes processing related to the operation of the control device 10 while controlling each component of the control device 10.

The storage unit 12 includes at least one semiconductor memory, at least one magnetic memory, at least one optical memory, or a combination of at least two of these. The semiconductor memory is for example RAM or ROM. "RAM" is an abbreviation for random access memory. "ROM" is an abbreviation for read only memory. The RAM is for example SRAM or DRAM. "SRAM" is an abbreviation for static random access memory. "DRAM" is an abbreviation for dynamic random access memory. ROM is, for example, EEPROM. "EEPROM" is an abbreviation for electrically erasable programmable read only memory. The storage unit 12 functions, for example, as a main storage device, an auxiliary storage device, or a cache memory. Information used for the operation of the control device 10 and information obtained by the operation of the control device 10 are stored in the storage unit 12. For example, the storage unit 12 may store system programs, application programs, databases, map information, and the like. The information stored in the storage unit 12 maybe updateable with information obtained from the network 30 via the communication unit 13.

The communication unit 13 includes at least one communication interface. The communication interface is, for example, a LAN interface, a LAN interface, or an interface compatible with mobile communication standards such as LTE, 4G, or 5G. The term "LTE" is an abbreviation for "long term evolution". The term "4G" is an abbreviation for "fourth generation". The term "5G" is an abbreviation for "fifth generation". The communication unit 13 receives data used for the operation of the control device 10 and transmits data obtained by the operation of the control device 10.

Functions of the control device 10 are realized by executing a program according to the present embodiment by a processor corresponding to the control unit 11. That is, the functions of the control device 10 are realized by software. The program causes the computer to function as the control device 10 by causing the computer to execute the operation of the control device 10. That is, the computer functions as the control device 10 by executing the operation of the control device 10 according to the control program.

The program can be stored in a non-transitory computer-readable medium. The non-transitory computer-readable medium in this embodiment is ROM. Examples of non-transitory computer-readable media include, but are not limited to, magnetic recording devices, optical discs, and magneto-optical recording media. The distribution of the program is carried out, for example, by selling, transferring, or renting a portable medium such as a DVD or a CD-ROM in which the program is stored. The term "DVD" is an abbreviation for "digital versatile disc". The term "CD-ROM" is an abbreviation for "compact disc read-only memory". The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the process of the computer corresponds to the "data equivalent to a program".

A part or all of the functions of the control device 10 maybe realized by a programmable circuit or a dedicated circuit as the control unit 11. That is, a part or all of the functions of the control device 10 maybe implemented by hardware.

Terminal Device 20

The terminal device 20 includes a control unit 21, a storage unit 22, a communication unit 23, an input/output unit 24 and an imaging unit 25.

The hardware configurations of the control unit 21, the storage unit 22, and the communication unit 23 of the terminal device 20 maybe the same as the hardware configurations of the control unit 11, the storage unit 12, and the communication unit 13 of the control device 10, respectively. The description here is omitted.

The input/output unit 24 includes at least one input/output interface. The input/output interface includes a touch screen integrated with the display. The input/output unit 24 receives an operation to input information used for the operation of the terminal device 20 and outputs information obtained by the operation of the terminal device 20. The input/output unit 24 maybe connected to the terminal device 20 as an external input device instead of being provided in the terminal device 20. As a connection method, for example, any method such as a universal serial bus (USB), a high-definition multimedia interface (HDMI) (registered trademark), or Bluetooth (registered trademark) can be used. The input/output unit 24 maybe composed of a separate input unit and an output unit instead of being integrated. In this case, the input unit includes at least one input interface such as a physical key, capacitive key, pointing device, or microphone. The output unit includes at least one output interface such as a display or speaker.

The imaging unit 25 includes one or more cameras. Each camera included in the imaging unit 25 is arranged at an appropriate position of the terminal device 20 so that the surroundings of the terminal device 20 can be imaged. For example, the imaging unit 25 includes at least one of an out-camera capable of imaging a subject on the side opposite to the user holding the terminal device 20 and an in-camera capable of imaging a subject on the side of the user holding the terminal device 20. The imaging unit 25 is not limited to this, and may include an omnidirectional camera capable of imaging the entire surroundings of the terminal device 20. The imaging unit 25 outputs an image generated by photographing to the control unit 21.

The operation of the control device 10 according to this embodiment will be described with reference to FIG. 3. This operation corresponds to the method according to this embodiment. Below, the control device 10 transmits and receives information to and from each device via the communication unit 13 and the network 30.

In S1 of FIG. 3, the control unit 11 of the control device 10 acquires designated location information regarding the designated location.

Any method may be employed to acquire the specified location information. In this embodiment, the control unit 11 acquires the specified location information by receiving it from the terminal device 20 of the user. In this embodiment, the designated location information includes an image of the designated location. For example, the user operates the terminal device 20 to take an image of an empty parking space next to the vehicle V in the parking lot as a specified location for arranging the power supply equipment C. The imaging unit 25 of the terminal device 20 outputs the generated image to the control unit 21. The control unit 21 transmits the image to the control device 10. At this time, the terminal device 20 may also transmit to the control device 10 reservation information indicating the desired reservation date and time for the user to receive the charging service. The reservation information may include, for example, user position information indicating the position of the terminal device 20 or the vehicle V as the user's position.

For example, an image captured by a camera included in the vehicle V may be transmitted to the control device 10, and the control unit 11 may receive the image as the specified location information.

In S2, the control unit 11 identifies the area of the specified place based on the acquired specified place information. In this embodiment, the control unit 11 calculates and identifies the area of the specified place based on the image included in the specified place information. The control unit 11 may calculate the area of the region indicated by the image using any image analysis technique.

For example, the control unit 11 transmits to the terminal device 20 information indicating a guideline for superimposing and photographing a reference object as a filter on the display serving as the input/output unit 24 when the terminal device 20 photographs. The reference object is, for example, a car stop. The terminal device 20 receives the information and causes the input/output unit 24 to display it. This allows the user to photograph the reference object and the guideline while superimposing them. For example, the control unit 11 of the control device 10 extracts a portion of the received image in which the color difference between pixels is equal to or greater than a predetermined value as an area secured by the user, and counts the number of pixels in the area. The control unit 11 may calculate the area information as the area by comparing with the number of pixels of the reference object indicated by the guideline. In this manner, the control unit 11 identifies the area of the specified location based on the image included in the specified location information.

Any method may be employed to identify the area of the specified location without being limited to this. For example, the control unit 11 may specify the area of the specified location by receiving information indicating the value of the area directly input to the terminal device 20 by the user. The terminal device 20 may transmit to the control device 10 information indicating the area of the specified location in stages of large, medium, and small. The control unit 11 of the control device 10 may refer to a database in which the value of the area corresponding to the information is registered in advance, read the value, and specify the area. The database may be stored in the storage unit 12. For example, in the database, "Large" corresponds to the numeric value of an area that is X square meters or more, "Medium" corresponds to the numeric value of an area that is less than X square meters and is equal to or more than Y square meters, and "Small" corresponds to the numeric value of an area that is less than Y square meters and is equal to or more than Z square meters. A user inputs information indicating "large" via the input/output unit 24 of the terminal device 20, and the information is transmitted to the control device 10. Upon receiving the information, the control unit 11 can refer to the database and specify the value of the area of X square meters or more. The information indicating the area in stages is not limited to the three stages of large, medium, and small, and may be information such as the area of one vehicle, the area of half the vehicle, and the like.

For example, the control unit 11 may specify the area by referring to a database in which the identification information of the user and the area of the parking lot of the user's house are associated and registered in advance. The identification information of the user may be the identification information of the terminal device 20. Specifically, the control unit 11 receives information indicating that the designated location is the home from the terminal device 20 as the designated location information, and obtains the designated location information. Information indicating the area of the parking lot of the user's house and corresponding to the identification information of the terminal device 20 maybe read out with reference to the database and specified. The database may be stored in the storage unit 12.

For example, the control device 10 may acquire the area information by referring to a database in which the position of an arbitrary parking lot and the area of each parking space in the parking lot are associated and registered in advance. Specifically, the control unit 11 acquires the user position information included in the reservation information by receiving it as the specified location information, refers to the database, and identifies the parking lot corresponding to the position indicated by the user position information, read and identify the area of each parking space in the identified parking lot. The database may be stored in the storage unit 12.

In S3, the control unit 11 determines whether or not the specified area is equal to or larger than the area required for arranging the power supply equipment C. When the control unit 11 determines that the specified area is equal to or larger than the area required for arranging the power supply equipment C (S3: YES), the processing of the control unit 11 proceeds to S5. When it is determined that the specified area is less than the area required for arranging the power supply equipment C (S3: NO), the process of the control unit 11 proceeds to S4.

Specifically, the area required for arranging the power supply equipment C may be the bottom area of the power supply equipment C that contacts the ground when it is arranged for charging. When the power supply equipment C is the power supply vehicle C2, the area required for arranging the power supply equipment C may be the area required for parking the power supply vehicle C2. The area required for arranging the power supply equipment C may be set in advance by, for example, a business operator that provides a charging service and stored in the storage unit 12.

In the present embodiment, the power supply equipment C is the power supply vehicle C2, and the control unit 11 determines that the specified area is equal to or larger than the area required for parking the power supply vehicle C2. In this case, the processing of the control unit 11 proceeds to S5.

First, the case where the processing of the control unit 11 advances to S4 in S3 will be described. In S4, the control unit 11 notifies the user that the area of the designated place is insufficient. Specifically, the control unit 11 transmits information indicating the notification to the terminal device 20 of the user. The terminal device 20 of the user receives the information and outputs it via the input/output unit 24, so that the user can know that the area of the designated place is insufficient. Notification may be by voice, text, or the like. After that, the operation of the control unit 11 of the control device 10 returns to S1.

The control unit 11 may transmit to the terminal device 20 information indicating the difference between the identified area and the area required for arranging the power supply equipment C. This allows the user to clearly know how much more area should be secured.

Next, the case where the processing of the control unit 11 advances to S5 in S3 will be described. In S5, the control unit 11 determines the power supply equipment C to be transported to the vehicle V of the user. For example, the control unit 11 may determine the power supply equipment C by referring to a database in which the identification information of the power supply equipment C, the date and time when the power supply equipment C is available, and the area required for arranging the power supply equipment C are recorded in association with each other. The database may be stored in the storage unit 12 of the control device 10, or may be stored in the storage unit 12 of an external server owned by a business operator managing the power supply equipment C, which is different from the control device 10. In this case, the control unit 11 of the control device 10 may communicate with the external server and refer to the database.

Specifically, the control unit 11 extracts, from among the plurality of pieces of power supply equipment C indicated by the database, the power supply facilities whose available dates and times include the date and time desired by the user indicated by the reservation information, It is determined as the power supply equipment C to be conveyed to the vehicle V of the user. The control unit 11 may select and determine power supply equipment whose area required for arrangement is less than the specified area and whose difference from the specified area is larger from the extracted pieces of power supply equipment. As a result, it becomes possible to automatically select and determine the power supply equipment C that can be reliably arranged at the location specified by the user when the vehicle V is actually transported.

The control unit 11 determines whether there is no power supply equipment among the plurality of pieces of power supply equipment C whose availability date and time includes the date and time desired by the user indicated by the reservation information, or when the extracted power supply equipment has an area required for arrangement. If there is no power supply facility with an area smaller than that specified from the specified location information, it may be determined not to transport the power supply equipment C. In this case, the control unit 11 may transmit to the terminal device 20 information indicating that there is no power supply equipment C that can be transported. The terminal device 20 outputs the information to the user through the input/output unit 24, so that the user can immediately know that there is no power supply equipment C to be transported.

In the present embodiment, it is assumed that the control unit 11 refers to the database and extracts the power supply vehicle C21 and the power supply vehicle C22 whose available dates and times include the reservation date and time indicated in the reservation information. The control unit 11 selects the power supply vehicle C21 having a larger difference between the area required for parking and the area specified by the control unit 11 based on the specified location information, from the power supply vehicle C21 and the power supply vehicle C22. It is determined that the vehicle V is to be transported. Conveying the power supply vehicle C2 specifically includes moving the power supply vehicle C2 to the vehicle V by automatic operation or human operation. In this manner, the control unit 11 can determine to transport the power supply vehicle C2 to the vehicle V when the specified area is equal to or larger than the area required for parking the power supply vehicle C2. In this manner, the control unit 11 can determine whether or not to transport the power supply equipment C based on the area of the specified location.

Any method may be employed to determine the power supply equipment C without being limited to this. For example, the control unit 11 may specify and determine the transportation vehicle C1V loaded with the power supply device C1 or the power supply vehicle C2 that is moving to provide charging services to other users different from the user. Specifically, the control unit 11 acquires position information indicating the position of the transportation vehicle C1V or the power supply vehicle C2 by receiving it from the transportation vehicle C1V or the power supply vehicle C2. Based on the acquired positional information of the transportation vehicle C1V or the power supply vehicle C2, the control unit 11 identifies the transportation vehicle C1V or the power supply vehicle C2 that is moving within a predetermined distance from the user's position indicated by the user position information. The control unit 11 may determine the power supply device C1 loaded on the specified transportation vehicle C1V or the specified power supply vehicle C2 as the power supply equipment C to be transported to the user. As a result, one power supply equipment C can be efficiently used to provide charging services to a plurality of nearby users.

The control unit 11 may notify the operator managing the power supply equipment C of the determined power supply equipment C. The control unit 11 may also notify the operator of the reservation information received from the user. The control unit 11 may transmit the user position information to the determined power supply vehicle C2. As a result, the power supply vehicle C2 may move directly to the user's vehicle V by automatic operation.

In S6, the control unit 11 determines a reward to be given to the user. The reward may be, for example, a coupon for use of charging services. Any technique may be employed to determine the reward. For example, when the power supply equipment C determined in S5 is transported to the user, the control unit 11 determines that the area of the specified location actually secured by the user is greater than or equal to the area required for disposing the power supply equipment C. In this case, a higher reward may be determined than in the case where the area of the designated place actually secured is less than the area required for arranging the power supply equipment C. For example, the control unit 11 may determine a higher reward as the identified area is larger.

The control unit 11 may determine the reward to be given to the user based on whether an event is being held within a predetermined distance from the user's position indicated by the user position information. Specifically, the control unit 11 refers to a database in which the date and time and place of the event are registered, and within a predetermined distance from the user's position indicated by the user position information, at a time zone including the reservation date and time indicated by the reservation information. Determines whether an event will occur. The database may be stored in the storage unit 12 in advance. When an event is held, the control unit 11 may determine a higher reward than when the event is not held.

The control unit 11 may determine the reward to be given to the user based on whether or not there is a tourist spot within a predetermined distance from the user's position indicated by the user position information. Specifically, the control unit 11 refers to a database in which places of tourist spots are registered, reads the positions of the tourist spots, and determine whether the tourist spot exists within a predetermined distance from the user's position indicated by the user position information. The database may be stored in the storage unit 12 in advance. When there is a tourist spot, the control unit 11 may determine a higher reward than when there is no tourist spot.

In this way, the control unit 11 can determine high rewards when it is expected that it will be difficult to secure a space for arranging the power supply equipment C due to the existence of an event or a tourist spot, that is, when it is expected to be more difficult in a case where the business operator trying to find a space to arrange the power supply equipment C by itself.

As shown in S6, the control unit 11 determines a reward to be given to the user when the specified area is equal to or larger than the area required for arranging the power supply equipment C.

In S7, the control unit 11 notifies the user of the determined reward. Specifically, the control unit 11 generates information for notifying the determined remuneration and transmits the information to the terminal device 20 of the user. The terminal device 20 receives the information and outputs it via the input/output unit 24, so that the user can know the reward. After that, the processing of the control unit 11 ends.

As described above, the control device 10 according to the present embodiment is used to provide a charging service for transporting the power supply equipment C used for charging the vehicle V to the location specified by the user. The control unit 11 of the control device 10 acquires the specified location information about the specified location, identifies the area of the specified location based on the specified location information, and determines whether to transport the power supply equipment C based on the area of the specified location. According to the present embodiment, it is possible to automatically determine and transport the power supply equipment C having a size suitable for the space of the specified location secured by the user. As a result, it is possible to suppress the occurrence of a situation in which the power supply equipment C cannot be arranged after going to the vehicle V. Therefore, it is possible to improve the technology of providing charging services.

As described above, in the control device 10 according to this embodiment, the specified location information includes an image of the specified location. The control unit 11 identifies the area of the specified location based on the image. According to this embodiment, the control unit 11 can accurately identify the area secured by the user based on the image. The user can easily transmit the specified place information by simply taking a picture of the specified place with the terminal device 20 or the like. Therefore, it is possible to improve the technology of providing charging services.

As described above, in the control device 10 according to the present embodiment, the control unit 11 determines a reward to be given to the user when the specified area is equal to or larger than the area required for arranging the power supply equipment C. According to this embodiment, since a reward is given, it becomes easier for the user to secure a sufficient empty space as the designated place in advance. Therefore, it is possible to improve the technology of providing charging services.

As described above, in the control device 10 according to this embodiment, the power supply equipment C includes the power supply vehicle C2. The control unit 11 determines to transport the power supply vehicle C2 to the vehicle V when the specified area is equal to or larger than the area required for parking the power supply vehicle C2. According to the present embodiment, when the power supply vehicle C2 goes to the user's vehicle V, it is possible to avoid the trouble of having to separately search for a parking lot because there is no space where the power supply vehicle C2 can be parked. Therefore, it is possible to improve the technology of providing charging services.

As described above, in the control device 10 according to the present embodiment, when the specified area is less than the area required for arranging the power supply equipment C, the control unit 11 notifies the user that the area of the specified location is insufficient. According to this embodiment, it is possible to automatically inform the user in advance that the area of the designated place is insufficient. Therefore, it is possible to improve the technology of providing charging services.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. A method that is executed by a control device used for providing a charging service in which power supply equipment used for charging a vehicle is transported to a designated location designated by a user, the method comprising:

displaying guidelines on a display of a terminal device used by the user, the guidelines being provided for positioning and sizing a reference object to be included in a designated location image captured by a terminal used by the user;

obtaining designated location information about the designated location from the terminal, the designated location information including the designated location image of the designated location;

estimating an area of the designated location based on the reference object included in the designated location image; and determining whether the estimated area of the designated location is sufficient to accommodate the power supply equipment; and transmitting information to the terminal device indicating the area of the designated place is insufficient in response to determining that the estimated area of the designated location is insufficient, or dispatching the power supply equipment to the designated location in response to determining that the estimated area of the designated location is sufficient.

2. The method according to claim 1 further comprising;

determining a reward to be given to the user when the estimated area is equal to or larger than a power supply equipment area needed to accommodate the power supply equipment.

3. The method according to claim 1, wherein:

the power supply equipment includes a power supply vehicle; and the method further comprises dispatching the power supply vehicle to the vehicle when the estimated area is equal to or larger than a parking area needed to accommodate parking of the power supply vehicle.

* * * * *